(12) United States Patent
Yabe et al.

(10) Patent No.: US 12,311,485 B2
(45) Date of Patent: May 27, 2025

(54) COOLANT SUPPLY DEVICE AND MACHINE TOOL

(71) Applicants: CITIZEN WATCH CO., LTD., Tokyo (JP); CITIZEN MACHINERY CO., LTD., Nagano (JP)

(72) Inventors: Koichi Yabe, Kitasaku-gun (JP); Tadayasu Shida, Kitasaku-gun (JP); Yosuke Ando, Kitasaku-gun (JP); Shinpei Kai, Kitasaku-gun (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 851 days.

(21) Appl. No.: 17/604,855

(22) PCT Filed: May 26, 2020

(86) PCT No.: PCT/JP2020/020798
§ 371 (c)(1),
(2) Date: Oct. 19, 2021

(87) PCT Pub. No.: WO2020/261844
PCT Pub. Date: Dec. 30, 2020

(65) Prior Publication Data
US 2022/0219273 A1    Jul. 14, 2022

(30) Foreign Application Priority Data

Jun. 24, 2019  (JP) .................. 2019-116352

(51) Int. Cl.
*B23Q 11/10* (2006.01)
*B05B 1/04* (2006.01)

(52) U.S. Cl.
CPC .............. *B23Q 11/10* (2013.01); *B05B 1/046* (2013.01)

(58) Field of Classification Search
CPC ..... B23Q 11/10; B23Q 11/1076; B05B 1/046; B05B 1/14; B05B 1/30; B05B 1/3026
See application file for complete search history.

(56) References Cited

U.S. PATENT DOCUMENTS 3,094,283 A   6/1963  Balister
5,313,743 A   5/1994  Peschik

FOREIGN PATENT DOCUMENTS

CN   206205098 U   5/2017
GB   2 259 267 A   3/1993
(Continued)

*Primary Examiner* — Sara Addisu
(74) *Attorney, Agent, or Firm* — CANTOR COLBURN LLP (57) ABSTRACT

Provided are a coolant supply device and a machine tool in which ejection of a coolant is easily switched on and off. A coolant supply device 10 for supplying a coolant to a workpiece machining area in a machine tool, the coolant supply device comprising: a rotary nozzle 40 formed to have a cylindrical shape and having, at an outer circumferential face thereof having the cylindrical shape, an ejection port 51 for ejecting the coolant; and a supply device body 20 rotatably supporting the rotary nozzle and configured to be capable of supplying the coolant to the rotary nozzle. The supply device body is configured to be capable of switching an ejection allowed range in which the ejection port is opened and an ejection stopped range in which the ejection port is blocked from each other in accordance with rotation of the rotary nozzle.

7 Claims, 7 Drawing Sheets

(56) References Cited

FOREIGN PATENT DOCUMENTS

| | | | | |
|---|---|---|---|---|
| JP | 60-172646 U | 11/1985 | | |
| JP | 7-24542 U | 5/1995 | | |
| JP | 08243876 A | * | 9/1996 | ......... B23Q 11/1076 |

* cited by examiner

COOLANT SUPPLY DEVICE AND MACHINE TOOL

TECHNICAL FIELD

The present invention relates to a coolant supply device and a machine tool.

BACKGROUND

Supplying a coolant, while cutting a portion to be machined, can restrain heat generation of a workpiece and a tool due to cutting resistance and friction. Patent Literatures 1 and 2 disclose a configuration of a coolant supply device capable of changing an ejection direction of a coolant.

PRIOR ART LITERATURE

Patent Literature

Patent Literature 1: Japanese Utility Model Application Laid-open No. S60-172646
Patent Literature 2: Japanese Utility Model Application Laid-open No. H7-24542

SUMMARY

Technical Problem

However, according to the configurations of Patent Literatures 1 and 2, ejection of a coolant cannot be easily switched on and off.

The present invention has been made in view of the above problem, and it is an object of the present invention to provide a coolant supply device and a machine tool in which ejection of a coolant is easily switched on and off.

Solution to Problem

Firstly, the present invention provides a coolant supply device for supplying a coolant to a workpiece machining area in a machine tool, the coolant supply device comprising: a rotary nozzle formed to have a cylindrical shape and having, at an outer circumferential face thereof having the cylindrical shape, an ejection port for ejecting the coolant; and a supply device body rotatably supporting the rotary nozzle and configured to be capable of supplying the coolant to the rotary nozzle, characterized in that the supply device body is configured to be capable of switching an ejection allowed range in which the ejection port is opened and an ejection stopped range in which the ejection port is blocked from each other in accordance with rotation of the rotary nozzle.

Secondly, the present invention provides the coolant supply device, characterized in that the supply device body includes an opposed curved wall capable of blocking the ejection port by being opposed to the ejection port.

Thirdly, the present invention provides the coolant supply device, characterized in that the rotary nozzle includes an adjustment groove provided at an end face of the rotary nozzle and formed along the same direction as an ejection direction of the coolant from the ejection port.

Fourthly, the present invention provides a machine tool comprising any of the above coolant supply devices.

Effects of Invention

The present invention can produce the following effects. In accordance with rotation, an ejection direction of a coolant can be changed, and accordingly the coolant supply device can be disposed, for example, below a spindle. Further, when the rotary nozzle rotates so that the supply device body blocks the ejection port, ejection of the coolant is stopped. Accordingly, ejection of the coolant can be easily switched on and off.

DESCRIPTION OF EMBODIMENTS

Figure 1:
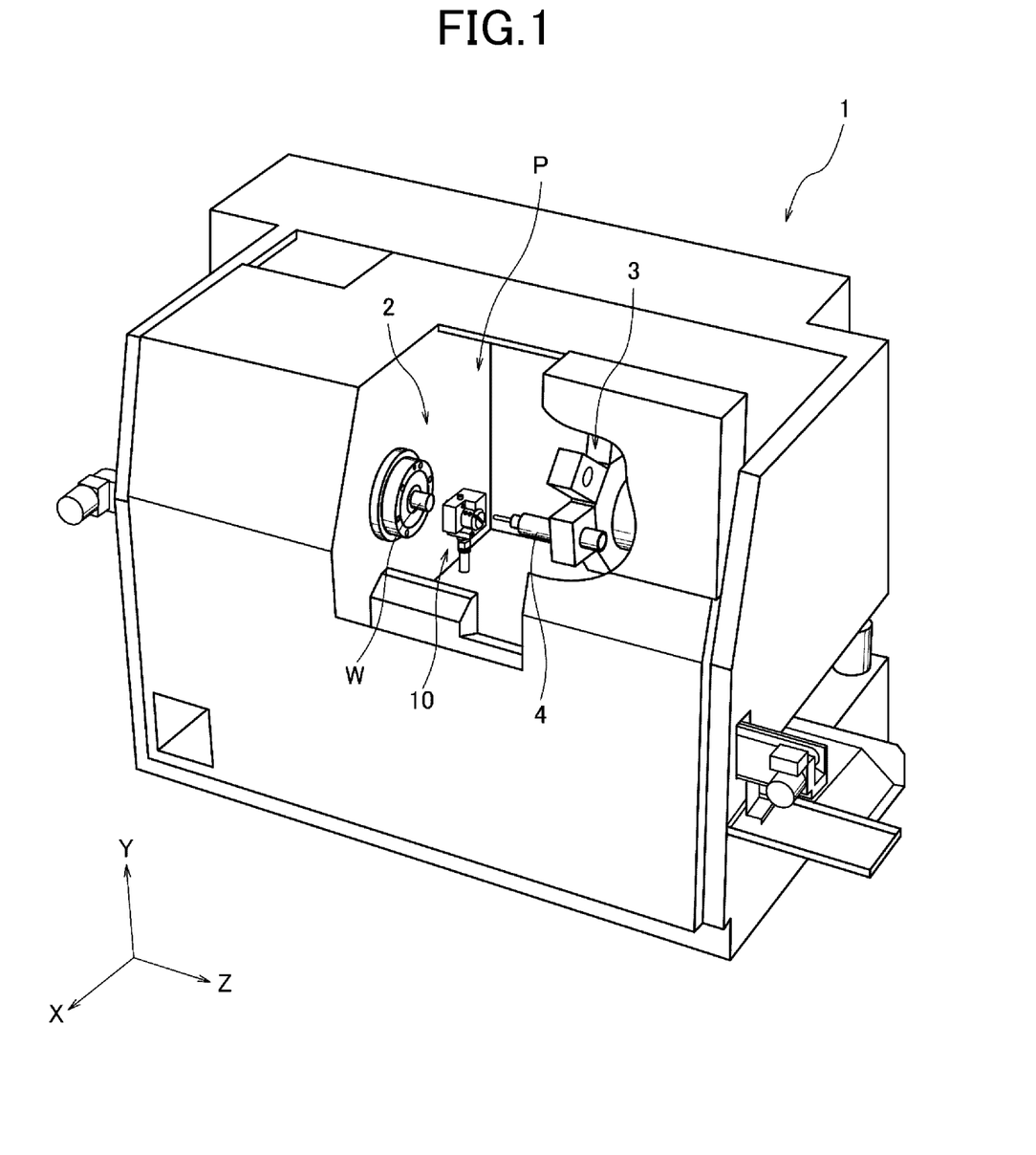
FIG. 1 is a view illustrating a machine tool in which a coolant supply device according to one embodiment of the present invention is installed.

Hereinafter, a coolant supply device 10 and a machine tool 1 of the present invention will be described in conjunction with the drawings. As illustrated in FIG. 1, the machine tool 1 includes a spindle 2 and a tool rest 3. The spindle 2 can grasp (hold) a workpiece W to be machined by means of a chuck. The workpiece W is formed to have a round rod shape, supported by the spindle 2 in a manner rotatable about a Z-axis, and supplied from rearward of the spindle 2 into a workpiece machining area P.

The coolant supply device 10 is disposed, for example, below the spindle 2 in the workpiece machining area P. The coolant supply device 10 is coupled to a coolant tank, and a coolant (also called a cutting oil) stored in the coolant tank is pumped up by a pump and supplied through the coolant supply device 10 to the workpiece W. The workpiece W is machined, while the coolant is poured thereon, into a predetermined shape using a tool 4 provided to the tool rest 3.

The coolant supply device 10 includes a supply device body 20 and a rotary nozzle 40.

Figure 2:
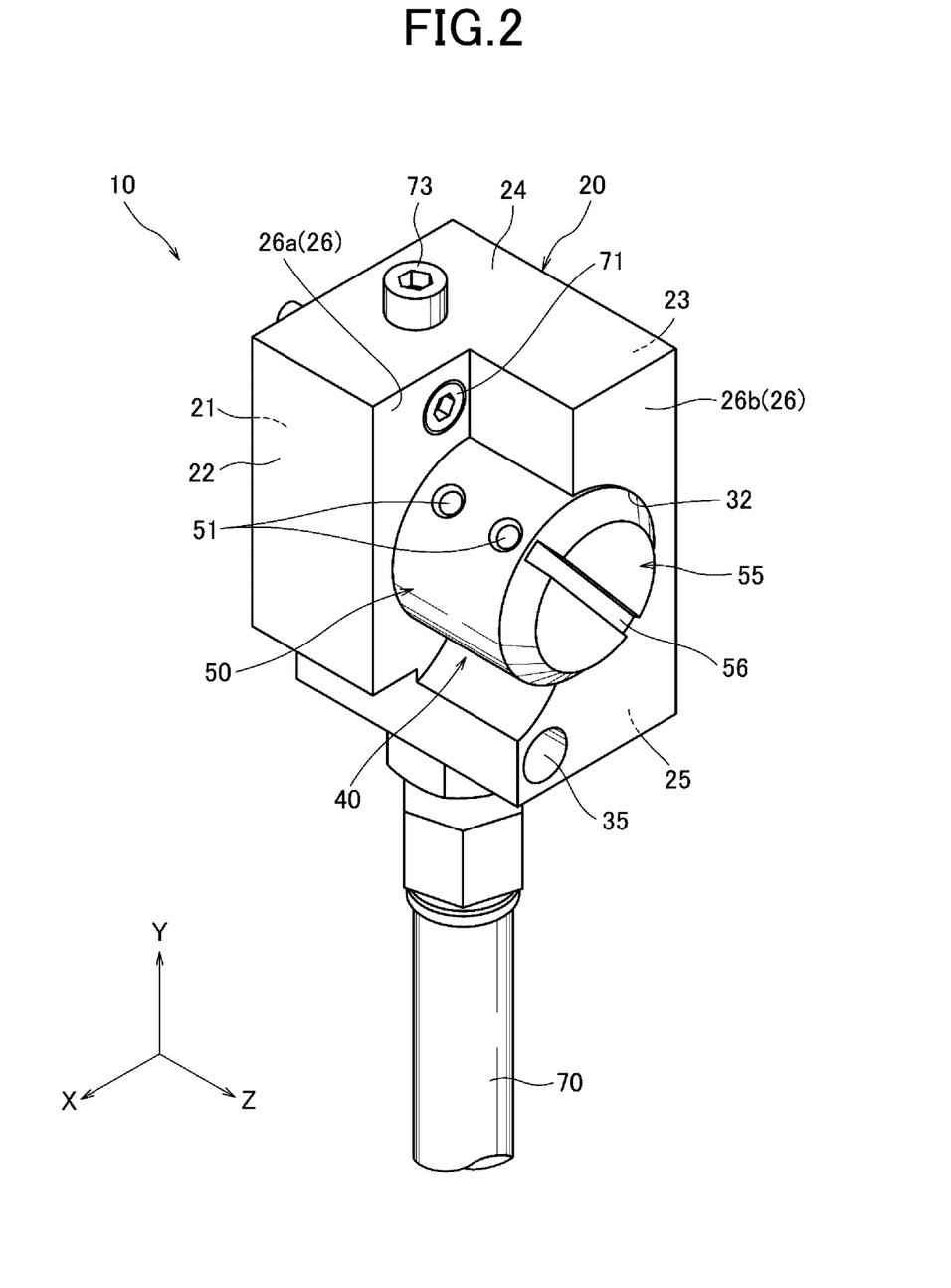
FIG. 2 is an external perspective view of the coolant supply device.

As illustrated in FIG. 2, the supply device body 20 has a shape, for example, of substantially a rectangular solid with one corner cut off, and has a rectangular fixing face 21. The fixing face 21 is fixed on a wall face which delimits the workpiece machining area P. The fixing face 21 is continuous with a front face 22 and a back face 23 in an X-axis direction, with a top face 24 and a bottom face 25 in a Y-axis direction, and is opposed to an open face 26.

For example, the open face 26 has a stepped shape. The open face 26 has an open face 26a on a front face side and an open face 26b on a back face side, and the open face 26a on the front face side is disposed lower than the open face 26b on the back face side (closer to the fixing face 21).

Figure 3:
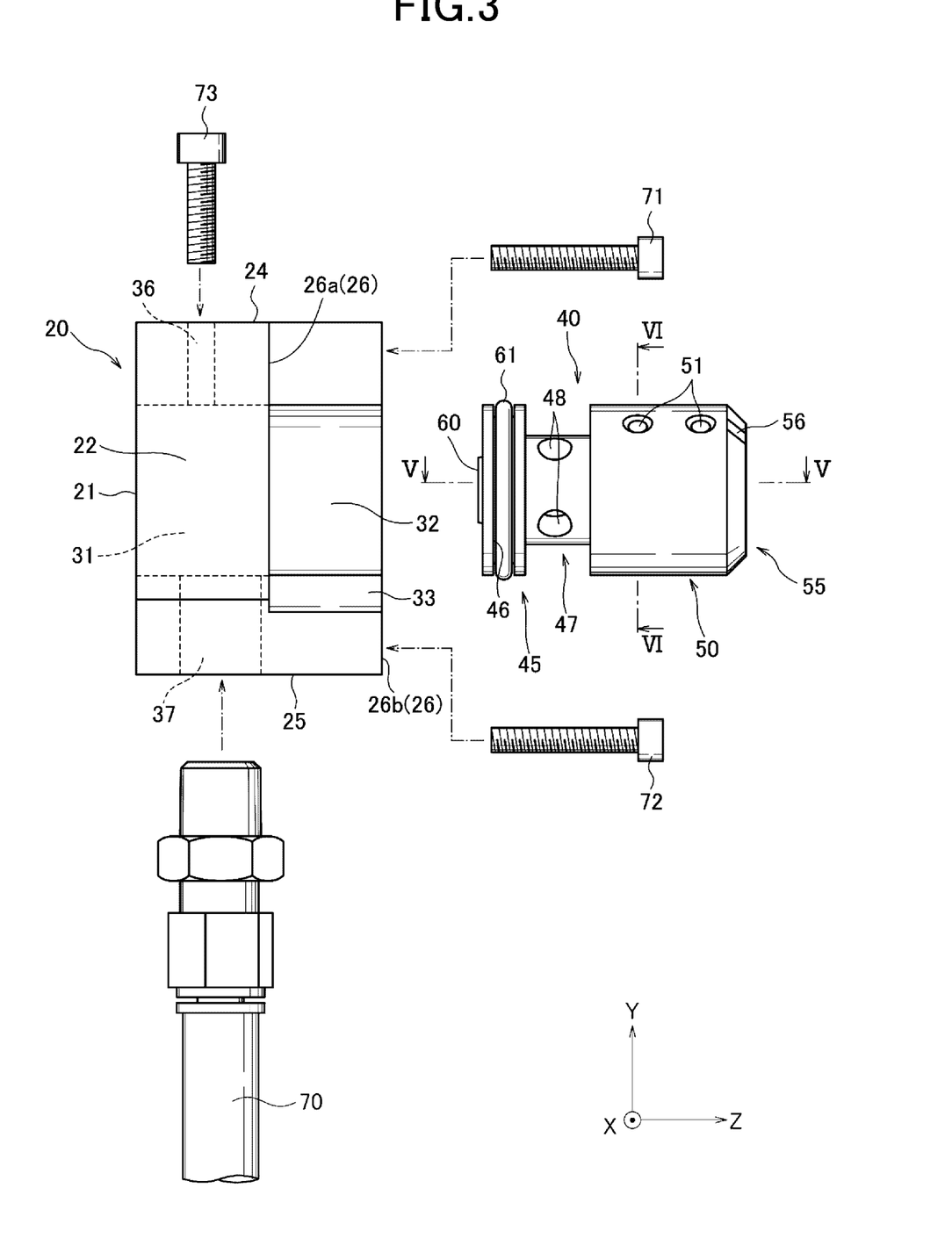
FIG. 3 is an exploded front view of the coolant supply device.

As illustrated in FIG. 3, an insertion hole 31 is formed in such a manner as to penetrate between the fixing face 21 and the open face 26a on the front face side. The insertion hole 31 has an inner diameter of a size allowing the rotary nozzle 40 to be inserted therein. The rotary nozzle 40 is rotatably inserted in the insertion hole 31.

Figure 4:
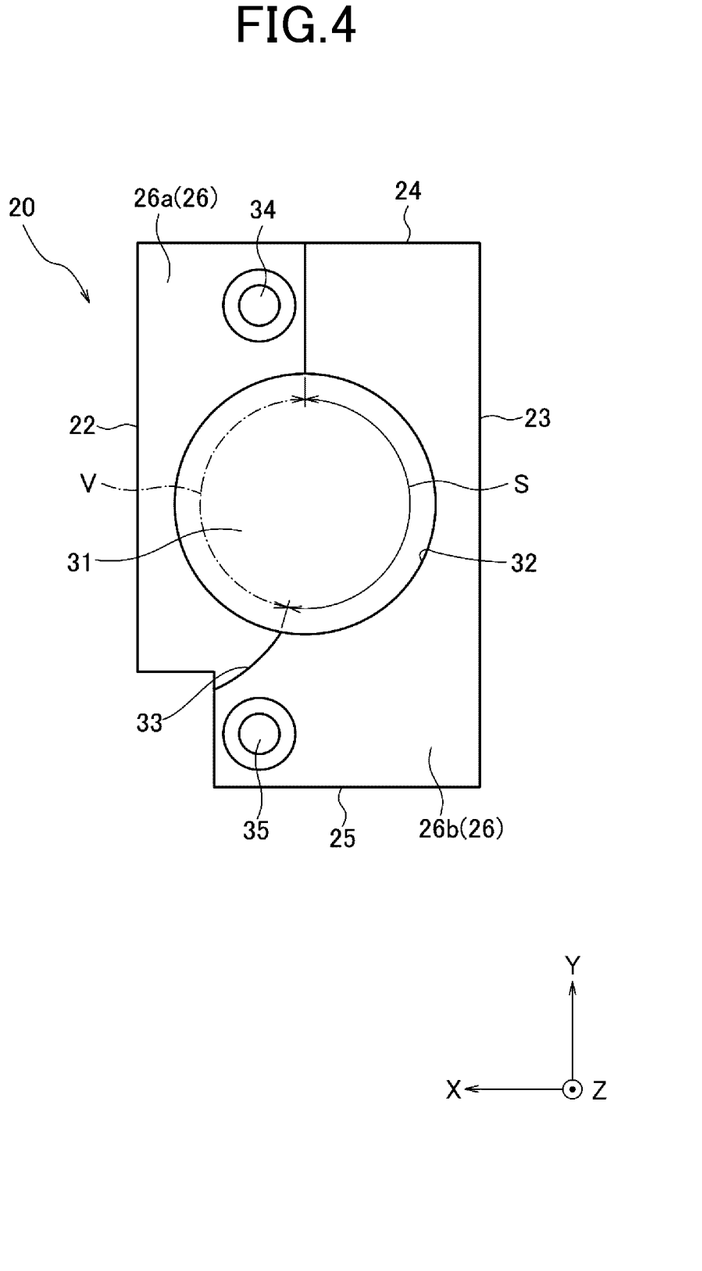
FIG. 4 is a right side view of a supply device body.

The insertion hole 31 has an inner wall extending to the open face 26b on the back face side and forming an opposed curved wall 32 which can be opposed to an outer circumferential face of the rotary nozzle 40. The opposed curved wall 32 is formed between the open face 26a on the front face side and the open face 26b on the back face side and formed, for example, at a position from 12 o'clock direction to 7 o'clock direction, where, as illustrated in FIG. 4, the open face 26 as seen from the open face 26 side is regarded as a clock dial. In such a range from 12 o'clock direction to 7 o'clock direction (ejection stopped range S: indicated by the solid line in FIG. 4), the opposed curved wall 32 is opposed to an ejection port 51 of the rotary nozzle 40 so as to block the ejection port 51.

On the other hand, when the open face 26 is similarly regarded as a clock dial, for example, in a range from 7 o'clock direction to 12 o'clock direction (ejection allowed range V: indicated by the one-dot chain line in FIG. 4), the opposed curved wall 32 is not opposed to the ejection port 51 and the ejection port 51 is opened.

Note that a curved face 33 is also formed at the front of the opposed curved wall 32, and this curved face 33 extends downward from an end of the opposed curved wall 32 and does not block the ejection port 51.

As illustrated in FIG. 4, the open face 26a on the front face side is provided with a fixing bolt hole 34 near the top face 24. The fixing bolt hole 34 is provided parallel to the insertion hole 31 and penetrates the open face 26a on the front face side and the fixing face 21. The open face 26b on the back face side is provided with a fixing bolt hole 35 near the bottom face 25. The fixing bolt hole 35 is provided parallel to the insertion hole 31 and penetrates the open face 26b on the back face side and the fixing face 21. A fixing bolt 71 is inserted into the fixing bolt hole 34 and a fixing bolt 72 is inserted into the fixing bolt hole 35, and each of the fixing bolts 71, 72 is tightened, whereby the supply device body 20 can be fixed to a wall face of the workpiece machining area P.

As illustrated in FIG. 3, a hose hole 37 for providing a coolant supply hose 70 is provided between the bottom face 25 and the insertion hole 31 to penetrate the same (indicated by the broken line in FIG. 3). The coolant can be supplied into the insertion hole 31 by connecting the coolant supply hose 70 to the hose hole 37 from the bottom face 25. On the other hand, a stopper bolt hole 36 is provided between the top face 24 and the insertion hole 31 to penetrate the same (indicated by the broken line in FIG. 3). A stopper bolt 73 is inserted into the stopper bolt hole 36 from the top face 24 so that a head end of the stopper bolt 73 comes into contact with a side wall of a small diameter portion 47 of the rotary nozzle 40, thereby being capable of preventing the rotary nozzle 40 from slipping off of the supply device body 20.

The rotary nozzle 40 includes a base portion 45 inserted into the insertion hole 31, a trunk portion 50 having the ejection port 51 for the coolant at an outer circumferential face, and a head end portion 55 located on a side opposite to the base portion 45 to have the trunk portion 50 therebetween.

Figure 5:
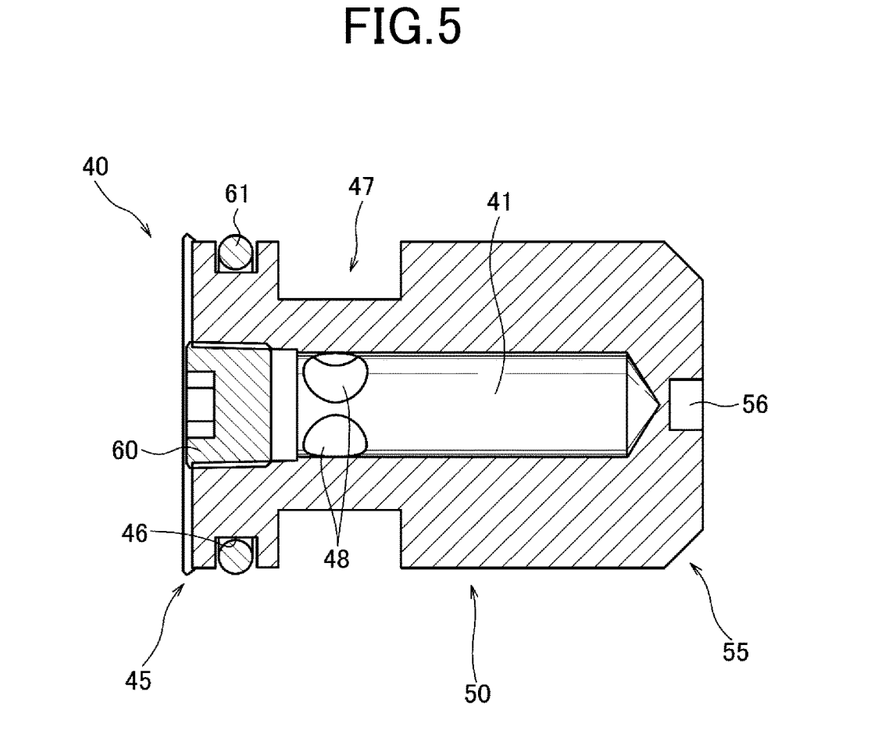
FIG. 5 is a cross-sectional view taken along the line V-V in FIG. 3.

As illustrated in FIG. 5, the rotary nozzle 40 has a cylindrical shape, and in the interior of the rotary nozzle 40, a coolant flow passage 41 is formed along a rotation axis direction of the rotary nozzle 40 (the same as a Z-axis direction indicated in FIG. 3). The coolant flow passage 41 extends from an end of the base portion 45 via the inside of the trunk portion 50 before the head end portion 55. The coolant flow passage 41 is closed at the base portion 45 by a stopper member 60.

The base portion 45 has an outer circumferential face formed with an annular groove 46 and provided with a seal member (for example, an O-ring) 61. Thereby, leakage of the coolant from between the outer circumference of the rotary nozzle 40 and an inner circumference of the insertion hole 31 is prevented.

The small diameter portion 47 is formed near the annular groove 46. The small diameter portion 47 can be opposed to a head end of the coolant supply hose 70 and functions as a coolant storage chamber before the coolant supplied from the coolant supply hose 70 is introduced into the coolant flow passage 41. The small diameter portion 47 and the coolant flow passage 41 communicate with each other through an inlet hole 48. Four pieces of inlet holes 48 in total are pierced in the small diameter portion 47, for example, at certain intervals (for example, 90°). Into the small diameter portion 47, the head end of the stopper bolt 73 can be also inserted.

Figure 6:
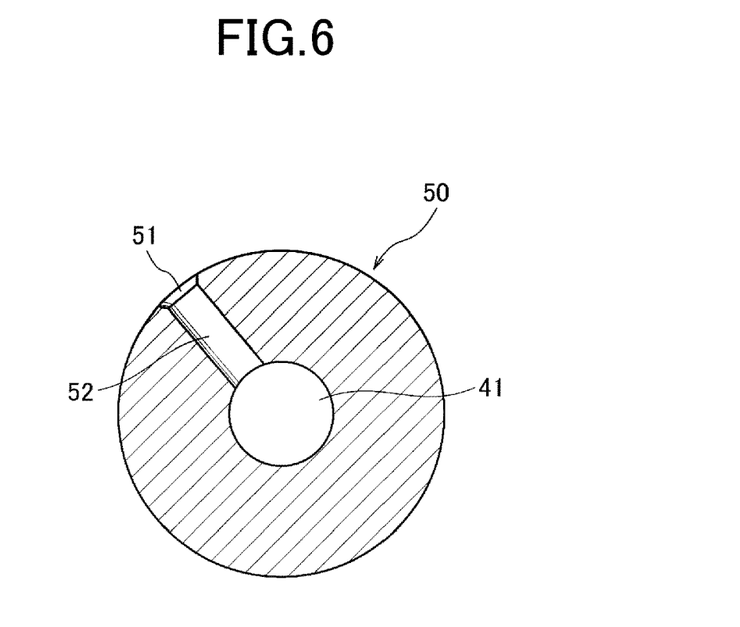
FIG. 6 is a cross-sectional view taken along the line VI-VI in FIG. 3.

For example, two pieces of ejection ports 51 are provided at the outer circumferential face of the trunk portion 50 along the rotation axis direction of the rotary nozzle 40 (the same as the Z-axis direction indicated in FIG. 3). As illustrated in FIG. 6, an outlet hole 52 is formed in the trunk portion 50 in such a manner as to communicate the ejection portion 51 and the coolant flow passage 41 with each other. A direction in which the outlet hole 52 is formed corresponds to an ejection direction of the coolant from the ejection portion 51.

The head end portion 55 has an adjustment groove 56 formed along the direction in which the outlet hole 52 is formed. The rotary nozzle 40 can be easily rotated relative to the supply device body 20 by disposing, for example, a flat head screwdriver at the adjustment groove 56 and then rotating the adjustment groove 56. From a direction in which the adjustment groove 56 is formed, the ejection direction of the coolant can be estimated. Note that a joint for rotating the rotary nozzle 40 may be attached to the head end portion 55.

Thus, the supply device body 20 allows the ejection allowed range V and the ejection stopped range S for a coolant to be switched from each other in accordance with rotation of the rotary nozzle 40.

Figure 7:
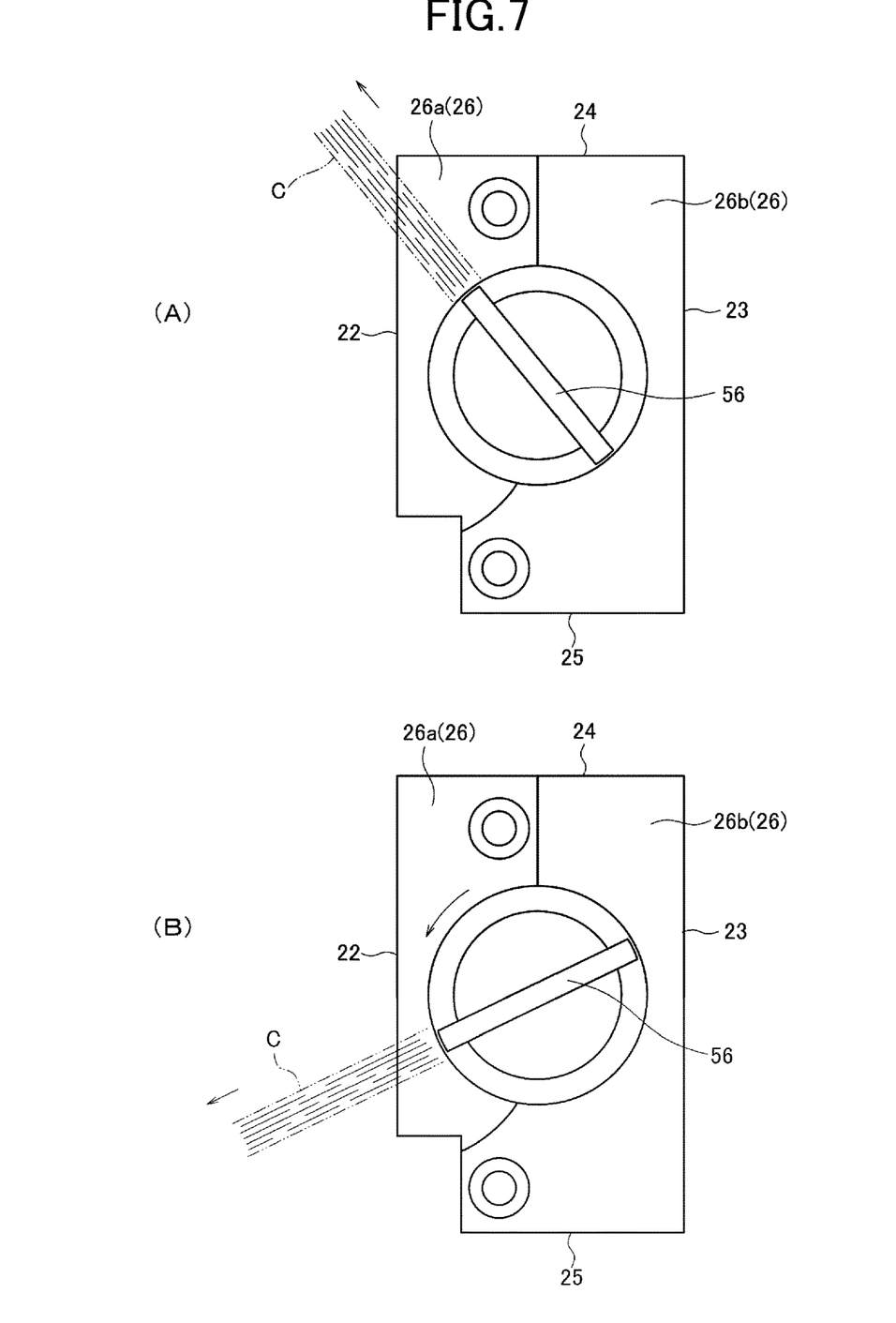
FIG. 7 is a view illustrating a coolant ejection allowed state.

Specifically, when the coolant supply device 10 is disposed below the spindle 2, as described with reference to FIG. 1, the adjustment groove 56 is rotated to orient the ejection port 51 toward diagonally upward. Accordingly, as illustrated in FIG. 7(A), a coolant C is supplied diagonally left upward, as seen in FIG. 7(A), to the workpiece W.

Meanwhile, when the coolant supply device 10 is disposed above the spindle 2, the adjustment groove 56 can be also rotated to orient the ejection port 51 toward diagonally downward. Then, the coolant C is supplied diagonally left downward, as illustrated in FIG. 7(B), to the workpiece W.

On the other hand, when the coolant C is not to be supplied to the workpiece W, the adjustment groove 56 is rotated such that the ejection port 51 is oriented toward the opposed curved wall 32. Specifically, when the open face 26 is regarded as a clock dial, placing the adjustment groove 56, for example, at a position of 1 o'clock direction, as illustrated in FIG. 8(A), allows the opposed curved wall 32 to block the ejection port 51 so that the coolant C is not supplied.

Figure 8:
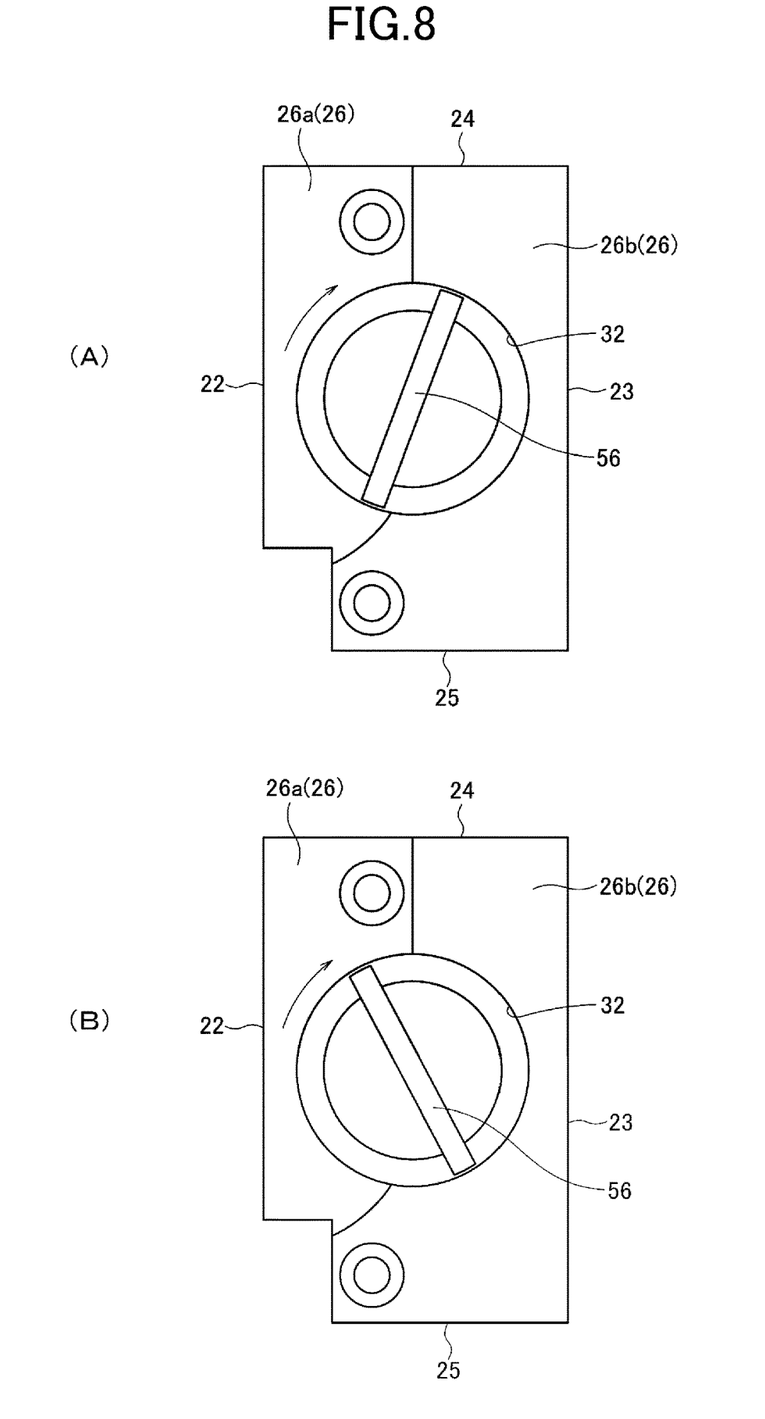
FIG. 8 is a view illustrating a coolant ejection stopped state.

Further, placing the adjustment groove 56, for example, at a position of 5 o'clock direction, as illustrated in FIG. 8(B), also allows the opposed curved wall 32 to block the ejection port 51 so that the coolant C is not supplied.

Thus, the rotary nozzle 40 rotates so that an ejection direction of the coolant C can be changed, and accordingly the coolant supply device 10 can be disposed at any position, for example, below the spindle 2, in the workpiece machining area P. Further, when the rotary nozzle 40 rotates so that the supply device body 20 blocks the ejection port 51, ejection of the coolant C is stopped. Accordingly, ejection of the coolant C can be easily switched on and off.

The adjustment groove 56 may be rotated during ejection of the coolant C. In such a case, during coolant ejection, the ejection direction of the coolant C can be changed. Further, during ejection of the coolant C, the ejection allowed range V and the ejection stopped range S can be also switched from each other.

REFERENCE SIGNS LIST

1 machine tool
2 spindle
3 tool rest
4 tool
10 coolant supply device
20 supply device body
21 fixing face
22 front face
23 back face
24 top face
25 bottom face
26 open face
26*a* open face on front face side
26*b* open face on back face side
31 insertion hole
32 opposed curved wall
33 curved face
34 fixing bolt hole
35 fixing bolt hole
36 stopper bolt hole
37 hose hole
40 rotary nozzle
41 coolant flow passage
45 base portion
46 annular groove
47 small diameter portion
48 inlet hole
50 trunk portion
51 ejection port
52 outlet hole
55 head end portion
56 adjustment groove
60 stopper member
61 seal member
70 coolant supply hose
71 fixing bolt
72 fixing bolt
73 stopper bolt
W workpiece
P workpiece machining area
C coolant
V ejection allowed range
S ejection stopped range

The invention claimed is:

1. A coolant supply device for supplying a coolant to a workpiece machining area in a machine tool, the coolant supply device comprising:
    a rotary nozzle formed to have a cylindrical shape and having, at an outer circumferential face thereof having the cylindrical shape, an ejection port for ejecting the coolant; and
    a supply device body having an insertion hole in which the rotary nozzle is inserted to rotatably support the rotary nozzle inserted in the insertion hole, and configured to be capable of supplying the coolant to the rotary nozzle,
    wherein, in the interior of the rotary nozzle, a coolant flow passage is formed along a rotation axis direction of the rotary nozzle,
    wherein an outlet hole is formed in the rotary nozzle extending in a direction corresponding to an ejection direction of the coolant from the ejection port, the outlet hole communicating the ejection port and the coolant flow passage to each other, and
    wherein the supply device body is configured to be capable of switching an ejection allowed range in which the ejection port is opened and an ejection stopped range in which the ejection port is blocked from each other in accordance with rotation of the rotary nozzle.

2. A machine tool comprising the coolant supply device according to claim 1.

3. A coolant supply device for supplying a coolant to a workpiece machining area in a machine tool, the coolant supply device comprising:
    a rotary nozzle formed to have a cylindrical shape and having, at an outer circumferential face thereof having the cylindrical shape, an ejection port for ejecting the coolant; and
    a supply device body rotatably supporting the rotary nozzle and configured to be capable of supplying the coolant to the rotary nozzle,
    wherein the supply device body is configured to be capable of switching an ejection allowed range in which the ejection port is opened and an ejection stopped range in which the ejection port is blocked from each other in accordance with rotation of the rotary nozzle, and
    wherein the supply device body includes an opposed curved wall capable of blocking the ejection port by being opposed to the ejection port.

4. The coolant supply device according to claim 3, wherein the rotary nozzle includes an adjustment groove provided at an end face of the rotary nozzle and formed along the same direction as an ejection direction of the coolant from the ejection port.

5. A machine tool comprising the coolant supply device according to claim 3.

6. A coolant supply device for supplying a coolant to a workpiece machining area in a machine tool, the coolant supply device comprising:
    a rotary nozzle formed to have a cylindrical shape and having, at an outer circumferential face thereof having the cylindrical shape, an ejection port for ejecting the coolant; and
    a supply device body rotatably supporting the rotary nozzle and configured to be capable of supplying the coolant to the rotary nozzle,
    wherein the supply device body is configured to be capable of switching an ejection allowed range in which the ejection port is opened and an ejection stopped range in which the ejection port is blocked from each other in accordance with rotation of the rotary nozzle, and wherein the rotary nozzle includes an adjustment groove provided at an end face of the rotary nozzle and formed along the same direction as an ejection direction of the coolant from the ejection port.

7. A machine tool comprising the coolant supply device according to claim 6.

\* \* \* \* \*